May 17, 1960 O. OPDERBECKE 2,936,852
DEVICE FOR REMOVING DUST AND LIQUID PARTICLES FROM GASES
Filed Jan. 10, 1958
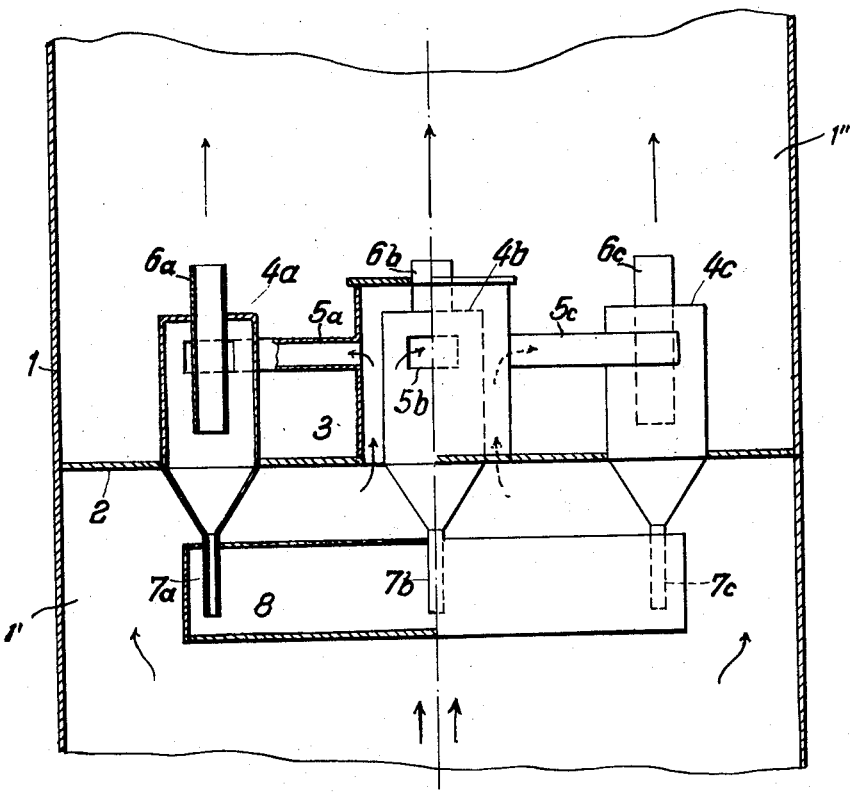
Inventor:
OTTO OPDERBECKE
By Karl F. Ross
AGENT

United States Patent Office 2,936,852
Patented May 17, 1960

2,936,852

DEVICE FOR REMOVING DUST AND LIQUID PARTICLES FROM GASES

Otto Opderbecke, Dusseldorf, Germany, assignor to Didier-Werke A.G., Wiesbaden, Germany, a corporation of Germany Application January 10, 1958, Serial No. 708,143

Claims priority, application Germany March 30, 1957

4 Claims. (Cl. 183—34)

My present invention relates to a device for the removal of dust particles and droplets from moisture-laden gases.

Industrial gases, such as those developed in coal-tar distillation, are frequently contacted with water sprays and other vaporized liquids for the purpose of dust removal, cooling and/or fractionated absorption of their components. As the gas passes in counterflow to the liquid stream, it unavoidably entrains particles of the treatment liquor which should be removed, along with any residual dust particles, before the gas is led to its ultimate destination. This result has hitherto been accomplished only imperfectly with the aid of impact separators, mechanical filters or the like which have heretofore been installed in washing towers, absorption columns, spray separators and similar apparatus and which in many cases objectionally increase the resistance encountered by the gas flow.

The invention has for its object the elimination of the aforementioned drawbacks in the separation of liquids and/or solids from a gas.

In accordance with one aspect of this invention, the gas to be purified is admitted through a partition into a separation chamber in which it is peripherally deflected from its direction of flow and centrifuged before resuming its travel, the impurities entrained by the gas being thus removed from it at this point. As the gas stream will usually travel in an upward direction, the impurities separated from it may advantageously be returned to a collector located underneath the aforementioned partition.

According to a more specific aspect of this invention I provide a plurality of cyclones supported next to one another on a horizontal partition, in combination with means for admitting the rising gas stream, following its passage through the partition, in parallel to the preferably peripherally arranged inlets of the several cyclones whence the gas, after centrifugation, is axially discharged in an upward direction to resume its original flow. The lower ends of the cyclone project through the partition to form axially descending outlets for the liquid and/or dust particles separated from the gas.

The invention will be described in greater detail with reference to the accompanying drawing the sole figure of which is a sectional elevation of an apparatus embodying the present improvement.

The apparatus shown in the drawing comprises an upright duct 1, which may form part of a single-stage or multi-stage washing tower, absorption column or the like, spanned by a partition 2 which carries three cyclones 4a, 4b and 4c. The lower or upstream compartment 1' of duct 1 opens into a cylinder 3 which rises from partition 2 within upper or downstream compartment 1" and surrounds the central cyclone 4b. The gas entering cylinder 3 from below is admitted in parallel into cyclones 4a, 4b, 4c via peripheral inlet conduits 5a, 5b, 5c, respectively. Following centrifugation, this gas finds its way into the upper compartment 1" through respective exit tubes 6a, 6b, 6c while the separated impurities are discharged by way of tubes 7a, 7b, 7c into a common waste collector 8, located below partition 2, which in turn may lead to a suitable drain not shown.

It will be noted that each of the three cyclones illustrated has a diameter substantially less than that of duct 1, this resulting in its operation at increased efficiency as is well known per se; reference may be made in this connection to the publication "Cyclone Dust Collectors" prepared by the American Petroleum Institute, New York, 1955, in which the operation of such cyclones has been more fully set forth.

The duct 1 shown in the drawing may be considered as part of a washing tower such as the one shown in the drawing of the co-pending application Serial No. 708,255, filed on even date herewith, by myself jointly with W. Kaiser and H. Grulich.

My invention is, of course, not limited to the specific embodiment shown and described, various modifications being possible without departing from the spirit and scope of the appended claims.

I claim:

1. In a duct carrying a stream of moisture-laden gas to be purified, in combination, a transverse partition subdividing said duct into an upstream compartment and a downstream compartment; a distributing cylinder of substantially smaller cross-sectional area than said duct supported on said partition in said downstream compartment, said partition having an aperture connecting the interior of said cylinder with said upstream compartment; a plurality of cyclone separators mounted on said partition externally of said cylinder, each of said cyclone separators having a generally cylindrical casing with an axis generally parallel to that of said duct, an inlet conduit extending substantially parallel to said partition from said cylinder to said casing, and a substantially axially extending outlet duct opening directly into said downstream compartment, said cyclone separators having discharge tubes passing through said partition into said upstream compartment; and a further cyclone separator in said cylinder substantially identical with said externally mounted cyclone separators, said further cyclone separator having an inlet opening into said cylinder and an outlet projecting axially through said cylinder into said downstream compartment.

2. The combination according to claim 1 wherein said cylinder is positioned centrally of said partition.

3. In a substantially vertical duct carrying a rising stream of moisture-laden gas to be purified, in combination, a substantially horizontal partition subdividing said duct into a lower compartment and an upper compartment; a distributing cylinder of substantially smaller cross-sectional area than said duct rising from a restricted portion of said partition within said upper compartment, said partition having an aperture connecting the interior of said cylinder with said lower compartment; a plurality of cyclone separators supported on other restricted portions of said partition externally of said cylinder, each of said cyclone separators having a generally cylindrical casing with a substantially vertical axis, an inlet conduit extending substantially horizontally from said cylinder to said casing, and a substantially vertical outlet duct opening directly into said upper compartment, said cyclone separators having depending discharge tubes passing through said partition into said lower compartment; and a further cyclone separator substantially identical with said externally mounted cyclone separators, said further cyclone separator being mounted centrally of said partition within said cylinder and being provided with an inlet opening substantially horizontally into said cylinder and with an outlet projecting substantially vertically through said cylinder into said upper compartment.

4. The combination according to claim 3, further comprising collector means common to all of said discharge tubes in said lower compartment.

References Cited in the file of this patent

UNITED STATES PATENTS

| | | |
|---|---|---|
| 2,399,509 | Rich | Apr. 30, 1946 |
| 2,515,155 | Munday | July 11, 1950 |
| 2,553,175 | Davenport et al. | May 15, 1951 |
| 2,731,102 | James | Jan. 17, 1956 |
| 2,765,918 | Fontein et al. | Oct. 9, 1956 |

FOREIGN PATENTS

| | | |
|---|---|---|
| 550,756 | France | Dec. 21, 1922 |
| 1,075,281 | France | Apr. 14, 1954 |
| 433,085 | Germany | Sept. 15, 1926 |
| 73,663 | Netherlands | Dec. 15, 1953 |
| 75,053 | Netherlands | June 15, 1954 |